US010233845B2

(12) United States Patent
Moniz et al.

(10) Patent No.: US 10,233,845 B2
(45) Date of Patent: Mar. 19, 2019

(54) BLEED VALVE ASSEMBLY FOR A GAS TURBINE ENGINE

(71) Applicant: General Electric Company, Schenectady, NY (US)

(72) Inventors: Thomas Ory Moniz, Loveland, OH (US); Joseph George Rose, Mason, OH (US); Patrick Sean Sage, West Chester, OH (US); Jeffrey Donald Clements, Mason, OH (US); Jeffrey Glover, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 15/287,782

(22) Filed: Oct. 7, 2016

(65) Prior Publication Data

US 2018/0100441 A1  Apr. 12, 2018

(51) Int. Cl.
| | |
|---|---|
| *F02C 9/18* | (2006.01) |
| *F04D 27/02* | (2006.01) |
| *F02C 7/20* | (2006.01) |
| *F01D 9/02* | (2006.01) |
| *F01D 25/24* | (2006.01) |
| *F02C 3/04* | (2006.01) |
| *F04D 27/00* | (2006.01) |
| *F04D 29/52* | (2006.01) |
| *F02C 6/08* | (2006.01) |
| *F04D 15/00* | (2006.01) |
| *F01D 25/16* | (2006.01) |

(52) U.S. Cl.
CPC ............... *F02C 9/18* (2013.01); *F01D 9/02* (2013.01); *F01D 25/24* (2013.01); *F02C 3/04* (2013.01); *F02C 6/08* (2013.01); *F02C 7/20* (2013.01); *F04D 27/009* (2013.01); *F04D 27/023* (2013.01); *F04D 27/0215* (2013.01); *F04D 29/522* (2013.01); *F01D 25/162* (2013.01); *F04D 15/0011* (2013.01); *F05D 2220/32* (2013.01); *F05D 2240/14* (2013.01); *F05D 2240/35* (2013.01); *F05D 2240/40* (2013.01); *F05D 2260/606* (2013.01)

(58) Field of Classification Search
CPC .... F02C 9/18; F02C 6/08; F02C 7/052; F01D 25/24; F01D 17/105; F04D 27/009; F04D 27/023; F04D 27/0215; F04D 29/545; F04D 15/0011; F02K 3/075
See application file for complete search history.

(56) References Cited

U.S. PATENT DOCUMENTS 3,638,428 A * 2/1972 Shipley .................... F02K 3/075
                                              60/226.1
4,610,265 A    9/1986 Nelson
(Continued)

*Primary Examiner* — Scott J Walthour
(74) *Attorney, Agent, or Firm* — General Electric Company; Pamela Kachur

(57) ABSTRACT

A gas turbine engine includes a first compressor, a casing surrounding the first compressor, and a liner extending forward from the first compressor. The gas turbine engine also includes a core turbine frame assembly extending between the liner and the casing and a bleed air assembly. The bleed air assembly includes a bleed valve positioned in the liner, and a duct in airflow communication with the bleed valve and defining in outlet. The duct is positioned within the core turbine frame assembly and extends to the casing.

9 Claims, 7 Drawing Sheets

(56) References Cited

U.S. PATENT DOCUMENTS

| | | | | |
|---|---|---|---|---|
| 5,044,153 A * | 9/1991 | Mouton | ............... | F02C 7/052 |
| | | | | 60/39.093 |
| 5,125,597 A | 6/1992 | Coffinberry | | |
| 5,261,228 A | 11/1993 | Shuba | | |
| 5,279,109 A * | 1/1994 | Liu | ............... | F02C 7/052 |
| | | | | 60/39.092 |
| 6,048,171 A * | 4/2000 | Donnelly | ............... | F01D 17/105 |
| | | | | 137/601.05 |
| 7,730,995 B2 * | 6/2010 | Hunt | ............... | F02C 9/18 |
| | | | | 181/210 |
| 8,307,943 B2 | 11/2012 | Klasing et al. | | |
| 8,336,288 B2 | 12/2012 | Venter | | |
| 8,511,096 B1 | 8/2013 | Haugen et al. | | |
| 8,550,208 B1 | 10/2013 | Potokar | | |
| 9,399,951 B2 | 7/2016 | Haugen et al. | | |
| 2005/0106009 A1 * | 5/2005 | Cummings | ............... | F01D 17/105 |
| | | | | 415/145 |
| 2008/0063515 A1 * | 3/2008 | Bil | ............... | F01D 17/105 |
| | | | | 415/145 |
| 2008/0219836 A1 | 9/2008 | Decker et al. | | |
| 2009/0056307 A1 * | 3/2009 | Mons | ............... | F01D 17/14 |
| | | | | 60/226.3 |
| 2014/0109589 A1 * | 4/2014 | Pritchard, Jr. | ............... | F02K 3/075 |
| | | | | 60/779 |
| 2014/0245747 A1 * | 9/2014 | Pritchard, Jr. | ............... | F01D 17/105 |
| | | | | 60/782 |
| 2015/0275758 A1 | 10/2015 | Foutch et al. | | |

* cited by examiner

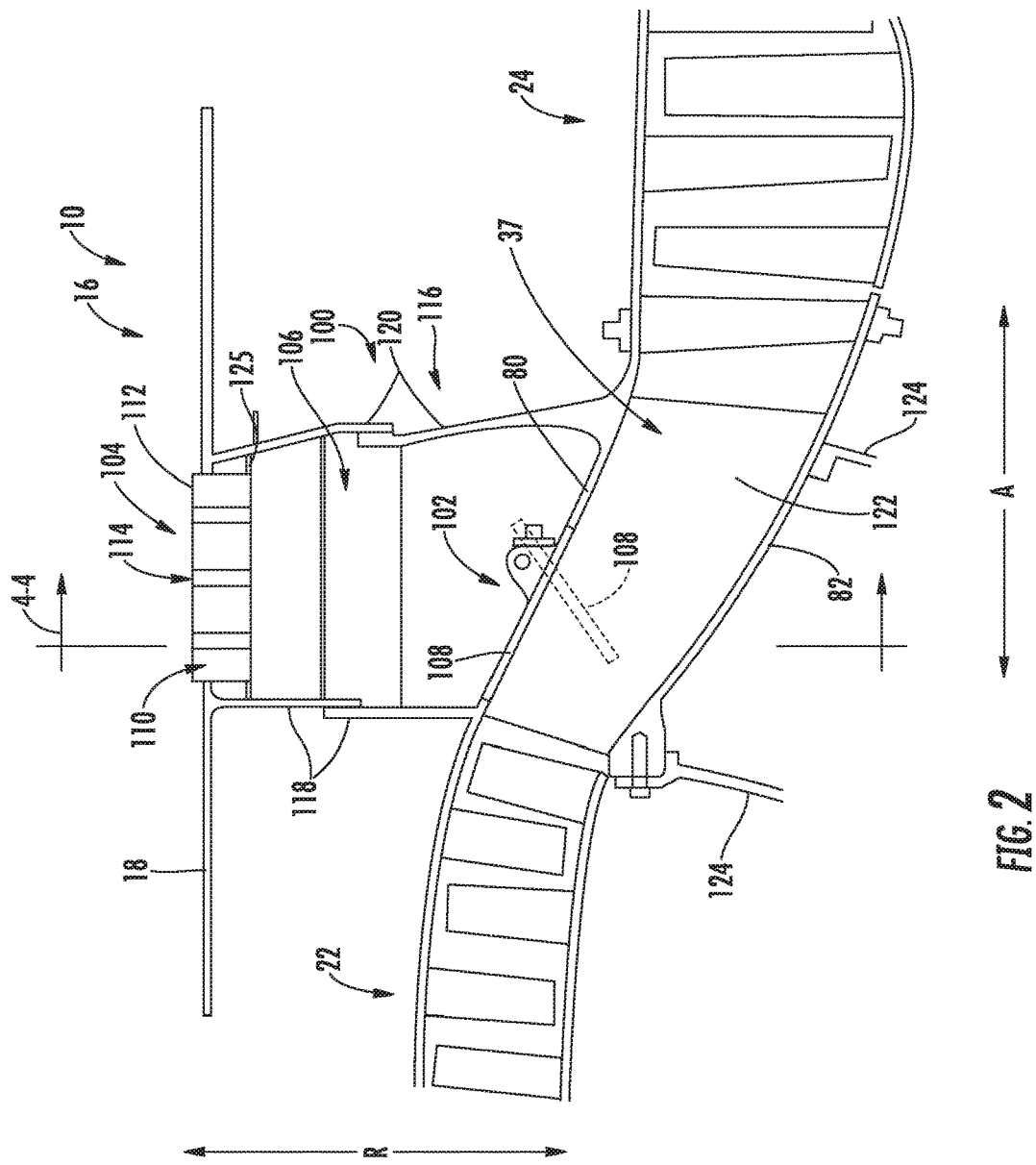
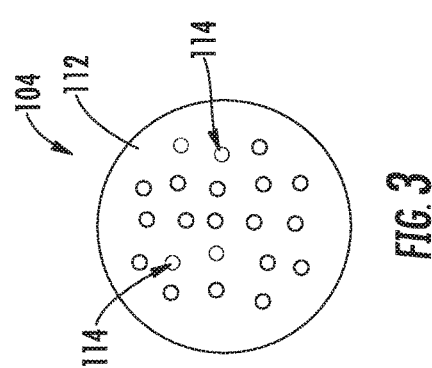

BLEED VALVE ASSEMBLY FOR A GAS TURBINE ENGINE

FIELD OF THE INVENTION

The present subject matter relates generally to a bleed valve assembly for a gas turbine engine.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. With multi-shaft gas turbine engines, the compressor section can include a high pressure compressor (HP compressor) and a low pressure compressor (LP compressor), and the turbine section can similarly include a high pressure turbine (HP turbine) and a low pressure turbine (LP turbine). With such a configuration, the HP compressor is coupled with the HP turbine via a high pressure shaft (HP shaft), and the LP compressor is coupled with the LP turbine via a low pressure shaft (LP shaft).

The various components of the compressor section, combustion section, turbine section, and exhaust section are enclosed by a casing of the core turbine engine. The space inward of the casing may be referred to as an "under-cowl" area. Within this under-cowl area, various accessory systems and enabling components for the compressor section, combustion section, and turbine section are positioned. As gas turbine engines advance, these accessory systems and enabling components may need more room within the under-cowl area.

However, it is typically undesirable to increase a size of the core turbine engine or core cowl to provide additional room in the under-cowl area for the various accessory systems and enabling components. Accordingly, a gas turbine engine having one or more components configured to increase an available space within the under-cowl area would be useful. More particularly, a gas turbine engine having one or more components configured to increase an available space within the under-cowl area without increasing a size of the core turbine engine or core cowl would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining an axial direction is provided. The gas turbine engine includes a first compressor, a casing surrounding the first compressor, and a liner extending forward from the first compressor. The gas turbine engine also includes a core turbine frame assembly extending between the liner and the casing and a bleed air assembly. The bleed air assembly includes a bleed valve positioned in the liner, and a duct in airflow communication with the bleed valve and defining in outlet. The duct is positioned within the core turbine frame assembly and extends to the casing.

In another exemplary embodiment of the present disclosure, a bleed air assembly for a gas turbine engine is provided. The gas turbine engine includes a first compressor, a casing surrounding the first compressor, a liner extending forward from the first compressor, and a core turbine frame assembly extending between the liner and the casing. The bleed air assembly includes a bleed valve positioned in the liner of the gas turbine engine when the bleed air assembly is installed in the gas turbine engine, and a duct in airflow communication with the bleed valve and defining an outlet. The duct is positioned within the core turbine frame assembly and extends to the casing of the gas turbine engine when the bleed air assembly is installed in the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a schematic, cross-sectional view of a compressor section of the exemplary gas turbine engine of FIG. 1.

FIG. 3 is a top view of a plate of a bleed air assembly in accordance with an exemplary embodiment of the present disclosure.

DETAILED DESCRIPTION OF THE INVENTION

Figure 1:
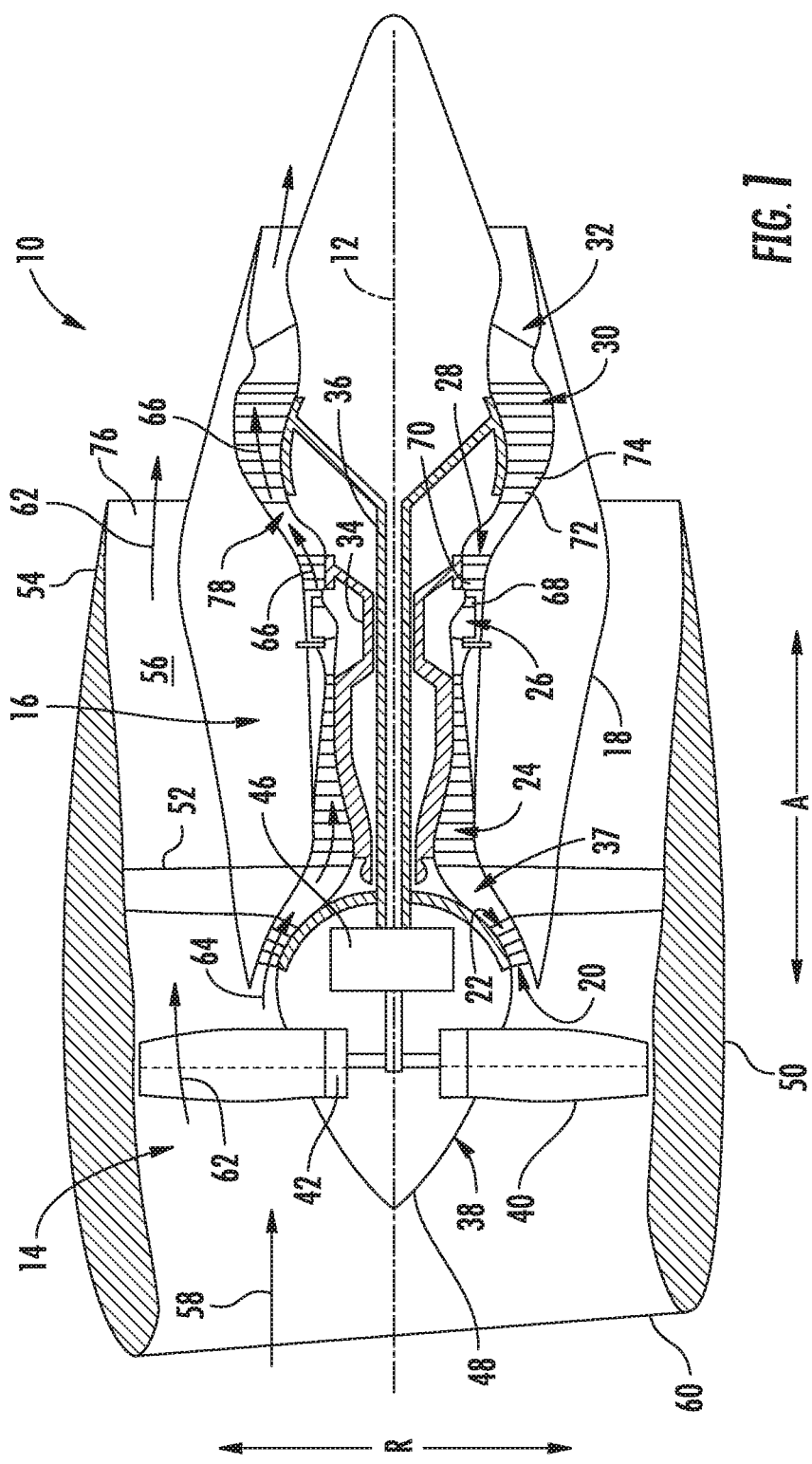
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37. Additionally, a space between the casing 18 and the compressors 22, 24, a combustor of the combustion section 26, and the turbines 28, 30 may be referred to as an "under-cowl" area.

For the embodiment depicted, the fan section 14 includes a fixed-pitch fan 38 having a plurality of fan blades 40 coupled to a disk 42 in a spaced apart manner. As is depicted, the fan blades 40 extend outwardly from disk 42 generally along the radial direction R. The fan blades 40 and disk 42 are together rotatable about the longitudinal axis 12 by LP shaft 36 across a reduction gearbox/power gear box 46. The reduction gearbox 46 includes a plurality of gears for adjusting, or rather, for reducing, the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58, as indicated by arrows 62, is directed or routed into the bypass airflow passage 56 and a second portion of the air 58, as indicated by arrow 64, is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Referring now to FIG. 2, a close-up, cross-sectional view is provided of the compressor section of the exemplary turbofan engine 10 of FIG. 1. As is depicted, the exemplary compressor section includes a first, LP compressor 22 and a second, HP compressor 24 located downstream of the LP compressor 22. A casing 18 of the core turbine engine 16 surrounds the LP compressor 22 and the HP compressor 24. Additionally, the core turbine engine 16 includes a flowpath liner extending forward from the LP compressor 22, between the LP compressor 22 and the HP compressor 24. Specifically, for the embodiment depicted, the core turbine engine 16 includes an outer flowpath liner 80 extending forward from the LP compressor 22, between the LP compressor 22 and the HP compressor 24, as well as an inner flowpath liner 82 located inward of the outer flowpath liner 80 along the radial direction R, and similarly extending between the LP compressor 22 and the HP compressor 24.

Moreover, the exemplary gas turbine engine depicted includes a bleed air assembly 100 allowing for the core turbine engine 16 to bleed off an amount of airflow from the core air flowpath 37—at a location downstream of the LP compressor 22 and upstream of the HP compressor 24—during operation of the turbofan engine 10. The exemplary bleed air assembly 100 depicted includes a bleed valve 102 positioned in the outer flowpath liner 80 and a duct 106 in airflow communication with the bleed valve 102 and defining an outlet 104. The outlet 104 is positioned at the casing 18 (i.e., the outlet 104 is defined by the duct 106 immediately inside the casing 18, within the casing 18 (e.g., within an opening of the casing 18), or immediately outside the casing 18). As is depicted, the bleed valve 102 includes a bleed valve door 108 that is movable between a closed position (depicted) and an open position (depicted in phantom). When in the open position, the bleed valve door 108 is configured to allow for an airflow (i.e., a flow bleed air) from the core air flowpath 37 at a location downstream of the LP compressor 22 to escape radially outward through the bleed valve 102 to the duct 106. Additionally, the duct 106 is configured to provide the flow bleed air from the bleed valve 102 through the outlet 104 when the bleed valve door 108 is in the open position. The outlet 104 of the duct 106 is positioned in airflow communication with the bypass passage 56 of the turbofan engine 10, for providing the bleed air to the bypass passage 56. By contrast, when the bleed valve door 108 is in the closed position, the bleed valve door 108 is substantially flush with the outer flowpath liner 80, and prevents a flow of compressed air from the core air flowpath 37 at a location downstream of the LP compressor 22 from escaping radially outward through the bleed valve 102.

Referring now briefly to FIG. 3, for the embodiment depicted the casing 18 defines an opening 110, and the bleed air assembly 100 includes a plate 112 positioned in or over the opening 110 in the casing 18 and at the outlet 104 defined by the duct 106. As is depicted, for the embodiment of FIG. 4, the plate 112 is configured as a "pepper-pot", having a plurality of openings 114 allowing for the flow of bleed air from the outlet 104 to pass therethrough. It should be appreciated, however, that in other exemplary embodiments of the present disclosure, the bleed air assembly 100 may have any other suitable structure at the outlet 104 of the duct 106. For example, in other embodiments, the bleed air assembly 100 may include a louvered design, or any other suitable outlet geometry to achieve desired exit flow properties.

Figure 4:
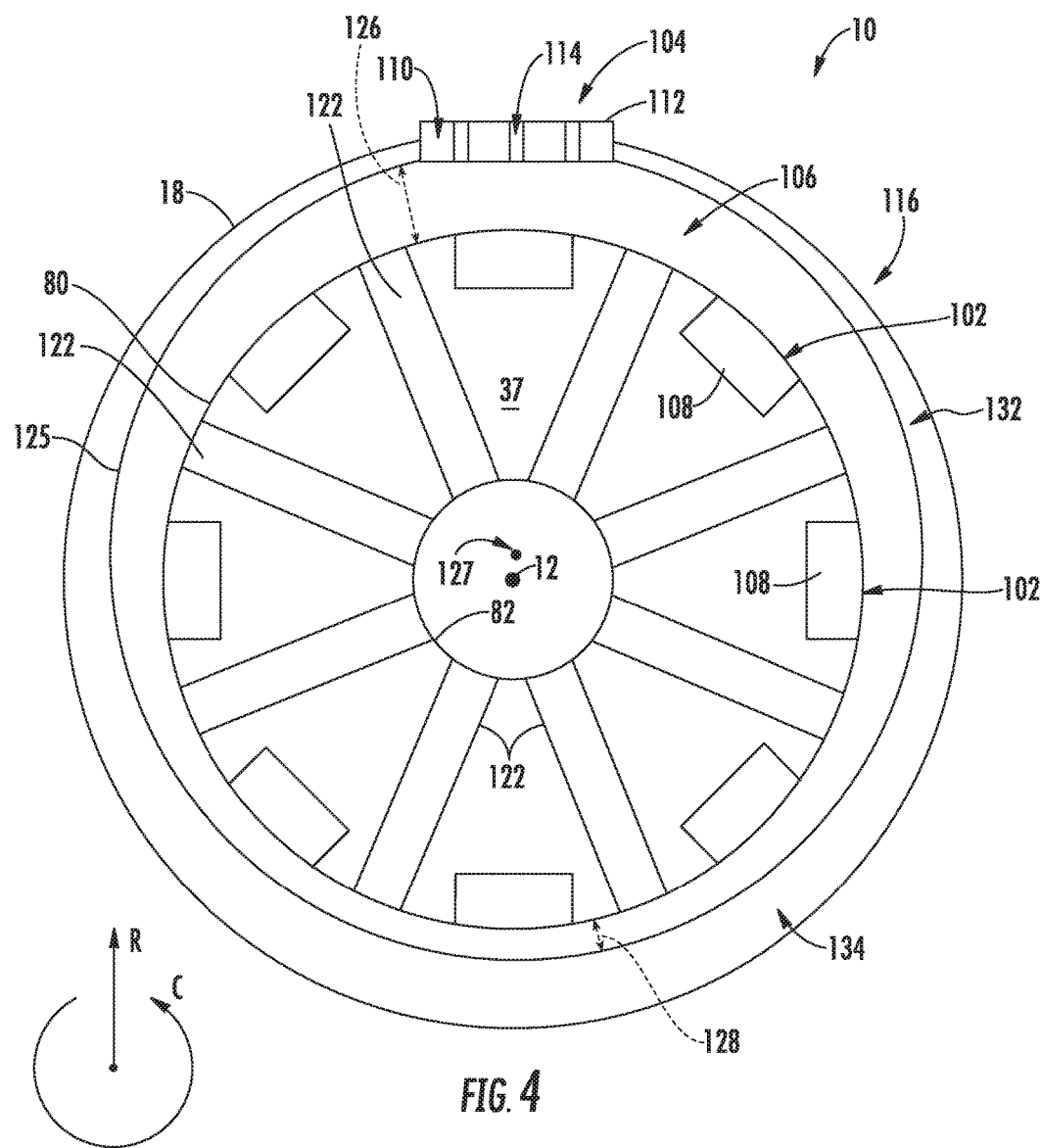
FIG. 4 is an axial view of a bleed air assembly in accordance with an exemplary embodiment of the present disclosure, as may be incorporated in the compressor section of the gas turbine engine of FIG. 1.

Referring now also to FIG. 4, a schematic, axial view through the bleed air assembly 100 of the turbofan engine 10, along Line 4-4 of FIG. 2, is provided. As is depicted, for the embodiment depicted, the bleed air assembly 100 more specifically includes a plurality of bleed valves 102 positioned in the outer flowpath liner 80, the plurality bleed valves 102 spaced along the circumferential direction C. Additionally, for the embodiment depicted, the duct 106 is in airflow communication with each of the plurality of bleed valves 102 for providing a flow bleed air from the plurality of bleed valves 102 to the outlet 104. Notably, for the embodiment depicted, the duct 106 defines a single outlet 104, such that all of the bypass air from the duct 106 is provided therethrough to the bypass passage 56.

As is also depicted in FIGS. 2 and 4, the turbofan engine 10 includes a core turbine frame assembly 116 extending between the outer flowpath liner 80 and the casing 18. For the embodiment depicted, the core turbine frame assembly 116 generally includes a forward frame member 118 and an aft frame member 120. For the embodiment depicted, the forward and aft frame members 118, 120 are each formed of at least two separate components. However, in other exemplary embodiments, one or both of the forward or aft frame members 118, 120 may be formed of a single component, or alternatively may be formed of any other number of components. Additionally, the turbofan engine 10 includes a plurality of struts 122 extending between the outer flowpath liner 80 and the inner flowpath liner 82, at a location downstream of the LP compressor 22 and upstream of the HP compressor 24. A plurality of support members 124 extend from the plurality of struts 122 inwardly generally along the radial direction R to provide support to various interior components of the turbofan engine 10. Accordingly, as will be appreciated, the plurality of support members 124, the plurality of struts 122, and the core turbine frame assembly 116 together provide structure and rigidity to the core turbine engine 16 of the turbofan engine 10.

Notably, for the embodiment depicted, the duct 106 of the bleed air assembly 100 is positioned within the core turbine frame assembly 116. More specifically, for the embodiment depicted, the duct 106 of the bleed air assembly 100 is integrated with the core turbine frame assembly 116, such that the forward frame member 118 and the aft frame member 120 of the core turbine frame assembly 116 at least partially form the duct 106 and define an airflow passage therethrough.

Referring particularly to FIG. 4, the duct 100 additionally includes a scroll liner 125 extending between the forward frame member 118 and the aft frame member 120, and extending generally along the circumferential direction C at a location between the outer flowpath liner 90 and the casing 18. For the embodiment depicted, the scroll liner 125 additionally defines the airflow passage through the duct 102 of the bleed air assembly 100. As is depicted, however, for the embodiment of FIG. 4 the scroll liner 125 does not extend concentrically with the outer flowpath liner 80 or the outer casing 18.

Specifically, in order to better accommodate a bleed air flow through the duct 106 of the bleed air assembly 100, the duct 106 is not uniformly shaped along the circumferential direction C (i.e., defines a nonuniform shape along the circumferential direction C). For example, for the embodiment depicted, scroll liner 125 is shifted such that a center 127 of the scroll liner 125 does not align with the longitudinal centerline 12 of the turbofan engine 10. Accordingly, the duct 106 defines a first thickness 126 along the radial direction R at the outlet 104 of the bleed air assembly 100 (for the embodiment depicted, between the scroll liner 125 and the outer flowpath liner 80). Additionally, the duct 106 defines a second thickness 128 along the radial direction R at a location spaced apart from the outlet 104 of the bleed air assembly 100 (for the embodiment depicted, also between the scroll liner 125 and the outer flowpath liner 80). For example, for the embodiment depicted, the second thickness 128 is defined at a location approximately one hundred and eighty degrees (180°) away from where the first thickness 126 is defined, relative to the longitudinal centerline 12 of the turbofan engine 10. For the embodiment depicted, the first thickness 126 is greater than the second thickness 128. For example, the first thickness 126 may be at least about ten percent (10%) greater than the second thickness 128, such as at least about twenty percent (20%) greater than the second thickness 128, such as at least about thirty percent (30%) greater than the second thickness 128. Accordingly, the duct 106 defines a greater volume proximate the outlet 104, as compared to a location away from the outlet 104.

Moreover, for the embodiment depicted, the bleed air assembly 100 includes a bleed valve 102 positioned between each adjacent pair of struts 122, or rather, a single bleed valve 102 positioned between each adjacent pair of struts 122. Additionally, the duct 106 of the bleed air assembly 100 extends continuously along the circumferential direction C around each of the plurality of bleed valves 102. Specifically, for the embodiment depicted, the duct 106 is an annular duct 106 extending continuously three hundred and sixty degrees (360°) along the circumferential direction C around the plurality bleed valves 102.

It should be appreciated, however, that in other exemplary embodiments, the bleed air assembly 100 may instead be configured in any other suitable manner. For example, referring now briefly to FIG. 5, a schematic, axial view is provided of a bleed air assembly 100 in accordance with another exemplary embodiment of the present disclosure. The exemplary bleed air assembly 100 depicted in FIG. 5 may be configured in substantially the same manner as exemplary bleed air assembly 100 described above with reference to FIGS. 2 and 4. Accordingly, the same or similar numbers may refer to the same or similar part.

Figure 5:
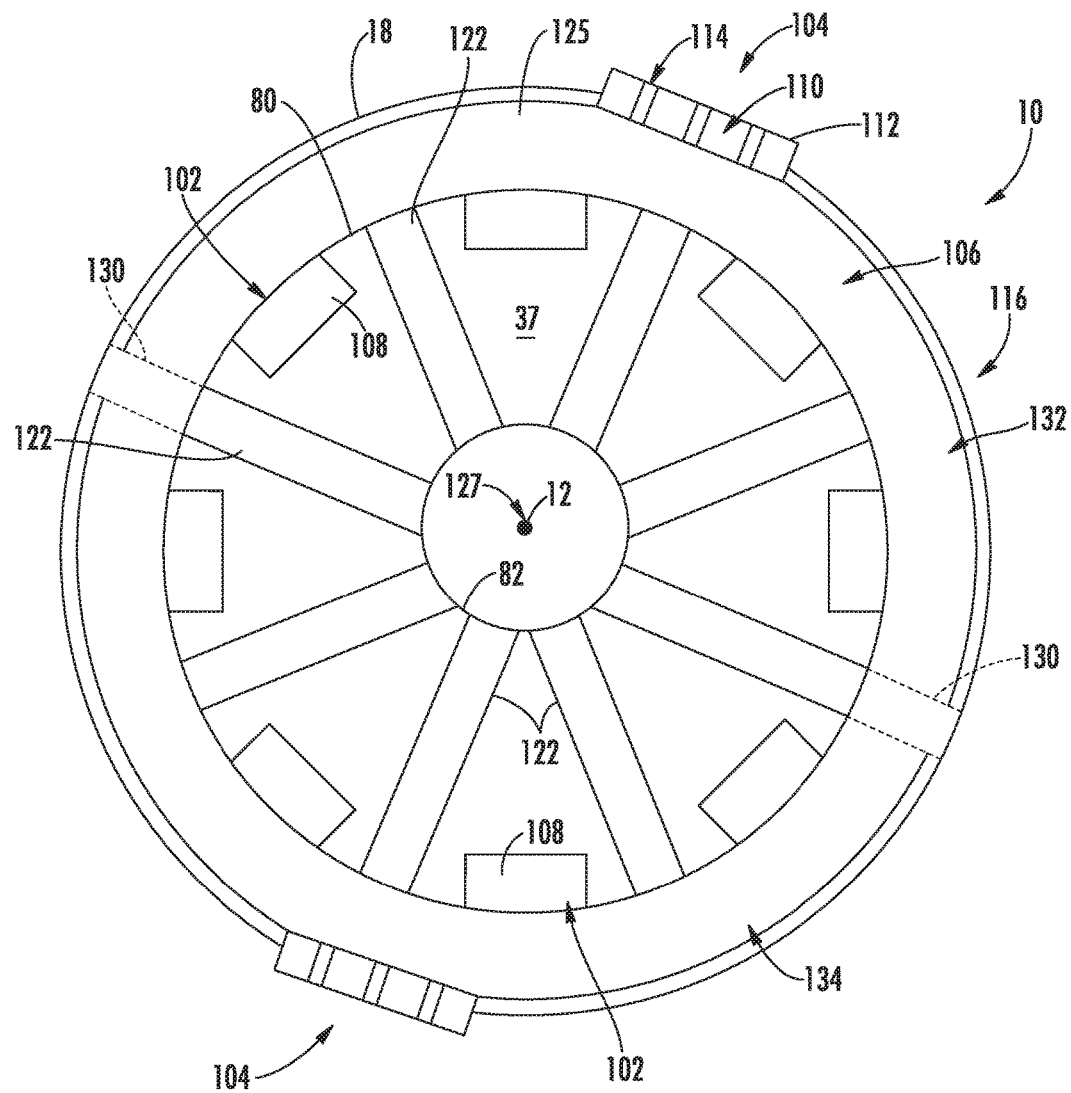
FIG. 5 is an axial view of a bleed air assembly in accordance with another exemplary embodiment of the present disclosure, as may be incorporated in the compressor section of the gas turbine engine of FIG. 1.

For example, the exemplary bleed air assembly 100 of FIG. 5 generally includes a plurality of bleed valves 102 positioned in an outer flowpath liner 80 and spaced along the circumferential direction C. However, instead of the duct 106 defining a single outlet 104 positioned at the casing 18 of the turbofan engine 10, the duct 106 of the exemplary bleed air assembly 100 depicted further defines a plurality of outlets 104 spaced along the circumferential direction C of the turbofan engine 10.

Notably, with such an exemplary embodiment, the duct 106 may not be configured as a completely continuous annular duct 106 extending continuously three hundred and sixty degrees (360°) along the circumferential direction C. As is depicted in phantom, the duct 106 may be segregated into two or more discrete sections by a plurality of dividers 130. For example, although the duct 106 may still be configured as an annular duct 106 in airflow communication with a plurality of bleed valves 102, the duct 106 may include a first section 132 in airflow communication with a first half of the plurality of bleed valves 102 and a second section 134 in airflow communication with a second half of the plurality of bleed valves 102. It should be appreciated, however, that in still other embodiments, the duct 106 may further be segregated into any other suitable number of discrete sections, with each discrete section in airflow communication with a plurality of bleed valves 102 and defining a dedicated outlet 104.

Figure 6:
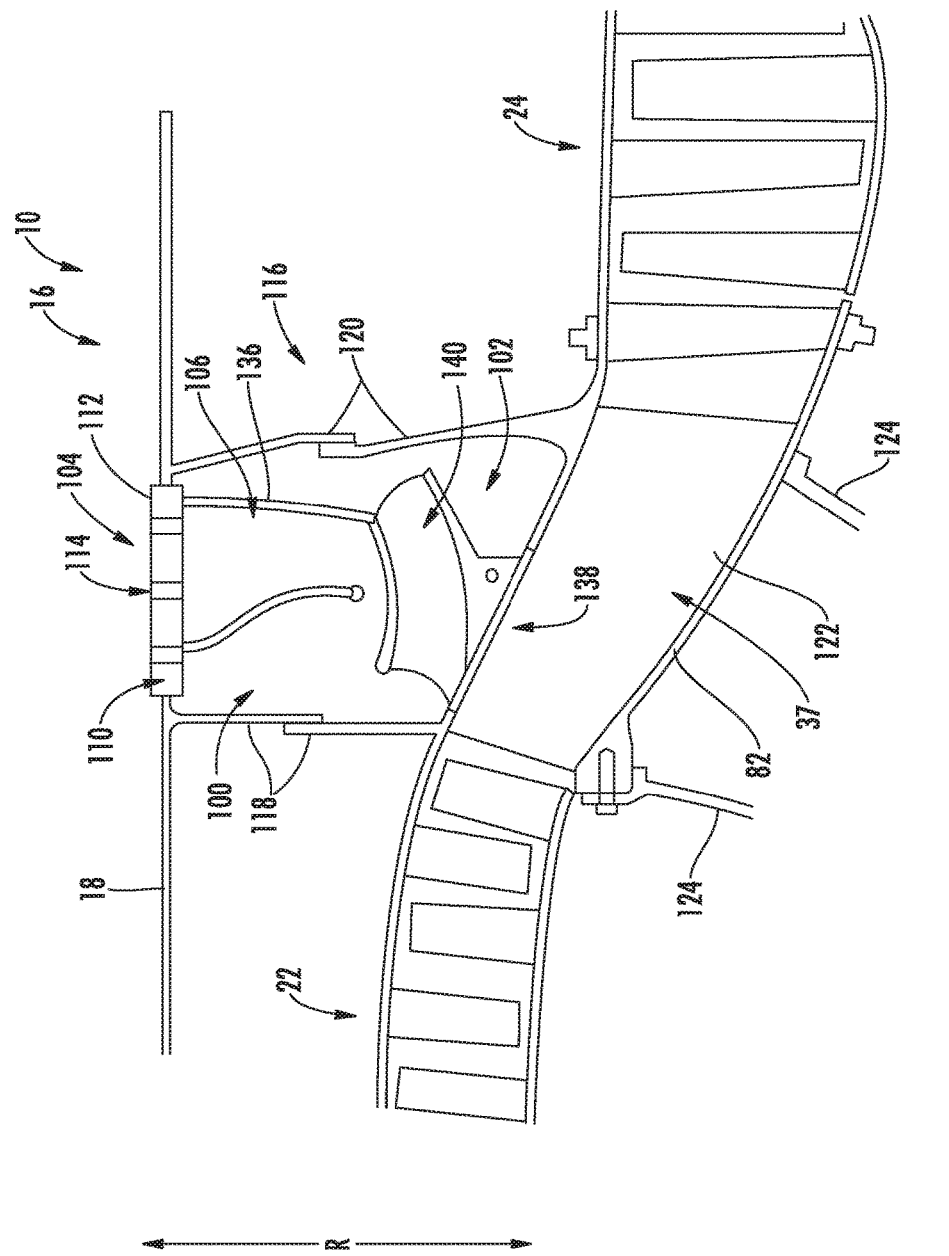
FIG. 6 is a schematic, cross-sectional view of a compressor section incorporating a bleed air assembly in accordance with yet another exemplary embodiment of the present disclosure.
Figure 7:
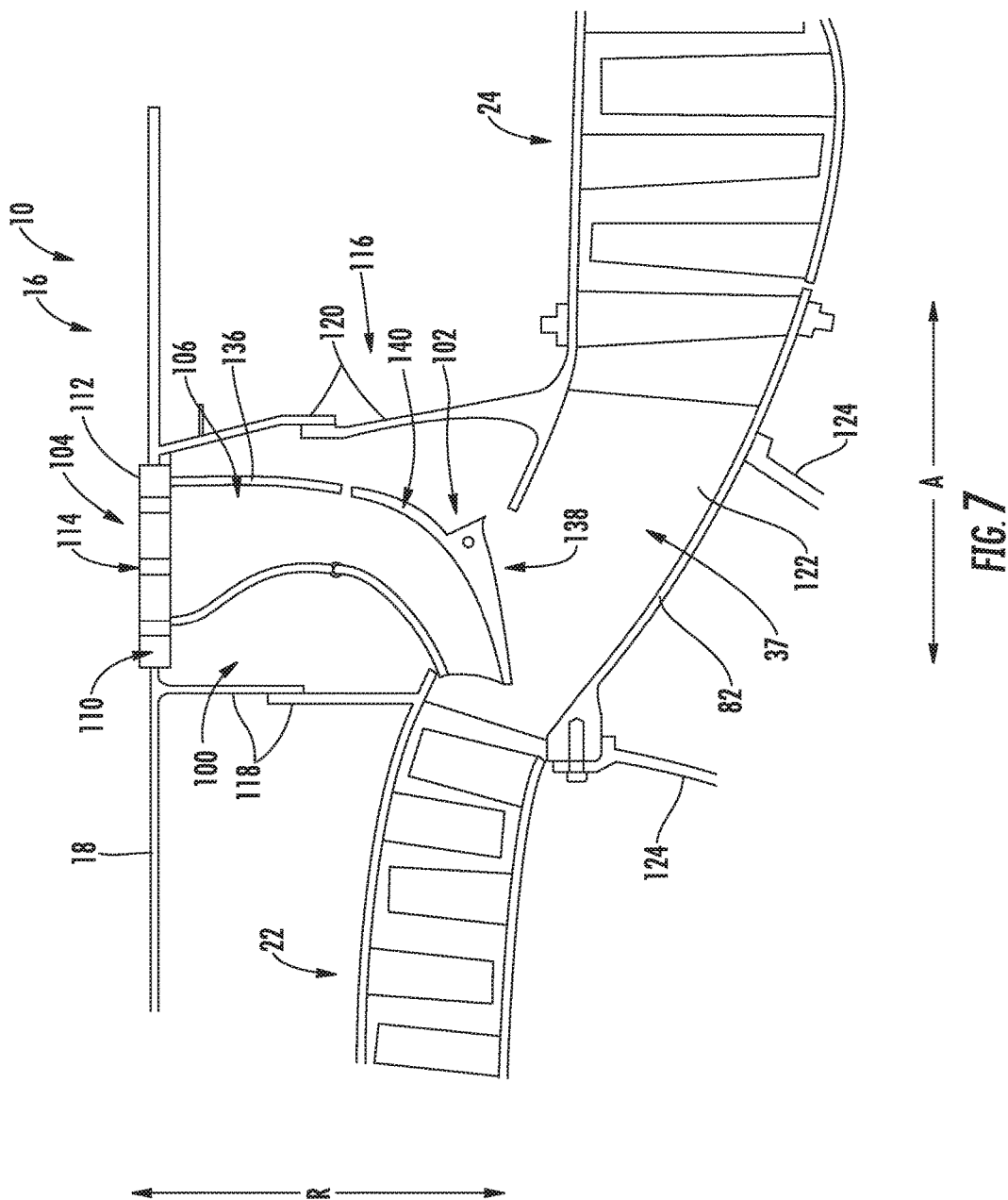
FIG. 7 is another schematic, cross-sectional view of the compressor section incorporating the exemplary bleed air assembly of FIG. 6.

Furthermore, referring now to FIGS. 6 and 7, a bleed air assembly 100 in accordance with yet another exemplary embodiment of the present disclosure is depicted. The exemplary bleed air assembly 100 of FIGS. 6 and 7 may also be configured in substantially the same manner as exemplary bleed air assembly 100 of FIGS. 2 through 4, and accordingly, the same or similar numbers may also refer to same or similar part.

For example, the exemplary bleed air assembly 100 of FIGS. 6 and 7 generally includes a bleed valve 102 positioned in the outer flowpath liner 80 extending between an LP compressor 22 and an HP compressor 24. Additionally, the exemplary bleed air assembly 100 includes a duct 106 in airflow communication with the bleed valve 102 and defining an outlet 104. The outlet 104 is positioned at a casing 18 of the core turbine engine 16. As is also depicted, the exemplary core turbine engine 16 of the turbofan engine 10 depicted includes a core turbine frame assembly 116 extending between the outer flowpath liner 80 and the casing 18, and the duct 106 of the exemplary bleed air assembly 100 is positioned within and extends through the core turbine frame assembly 116 to the casing 18.

More specifically, as with the embodiment above, the exemplary core frame assembly generally includes a forward frame member 118 and an aft frame member 120, and the duct 106 extends along the radial direction R at an axial location between the forward frame member 118 and the aft frame member 120 (i.e., along the axial direction A). Similarly, the outlet 104 defined by the duct 106 of the bleed air assembly 100 is positioned at the casing 18 at an axial location forward of the aft frame member 120 of the core turbine frame assembly 116 and aft of the forward frame member 118 of the core turbine frame assembly 116.

However, for the embodiment depicted, the duct 106 of the bleed air assembly 100 includes a liner structure 136 separate from the forward and aft frame members 118, 120 of the core turbine frame assembly 116 (with the liner structure 136 defining the outlet 104). Additionally, for the embodiment depicted, the bleed valve 102 includes a door assembly 138 movable between an open position and a closed position (similar to the exemplary bleed valve door 108 described above). FIG. 6 depicts the door assembly 138 of the bleed valve 102 in the closed position, and FIG. 7 depicts the door assembly 138 of the bleed valve 102 in the open position. The door assembly 138 of the bleed valve 102 includes a transition passage 140. When the door assembly 138 is in the closed position, the transition passage 140 of the door assembly 138 is misaligned with the liner structure 136 of the duct 106 (see FIG. 6). However, when the door assembly 138 is in the open position, the transition passage 140 is aligned with the liner structure 136 of the duct 106 (see FIG. 7). Accordingly, when the door assembly 138 is in the open position, the transition passage 140 is in airflow communication with the duct 106, and more particularly, the transition passage 140 fluidly connects the core air flowpath 37 of the core turbine engine 16 at a location downstream of the LP compressor 22 with the liner structure 136 of the duct 106 of the bleed air assembly 100.

Accordingly, the exemplary bleed air assembly 100 of FIGS. 6 and 7 may efficiently redirect bleed air from the core air flowpath 37 radially outward in a more axially compact manner, allowing for the duct 106 of the bleed air assembly 100 to be contained axially within the core turbine frame assembly 116. Such a configuration may provide for additional under-cowl room within the core turbine engine 16.

Figure 8:
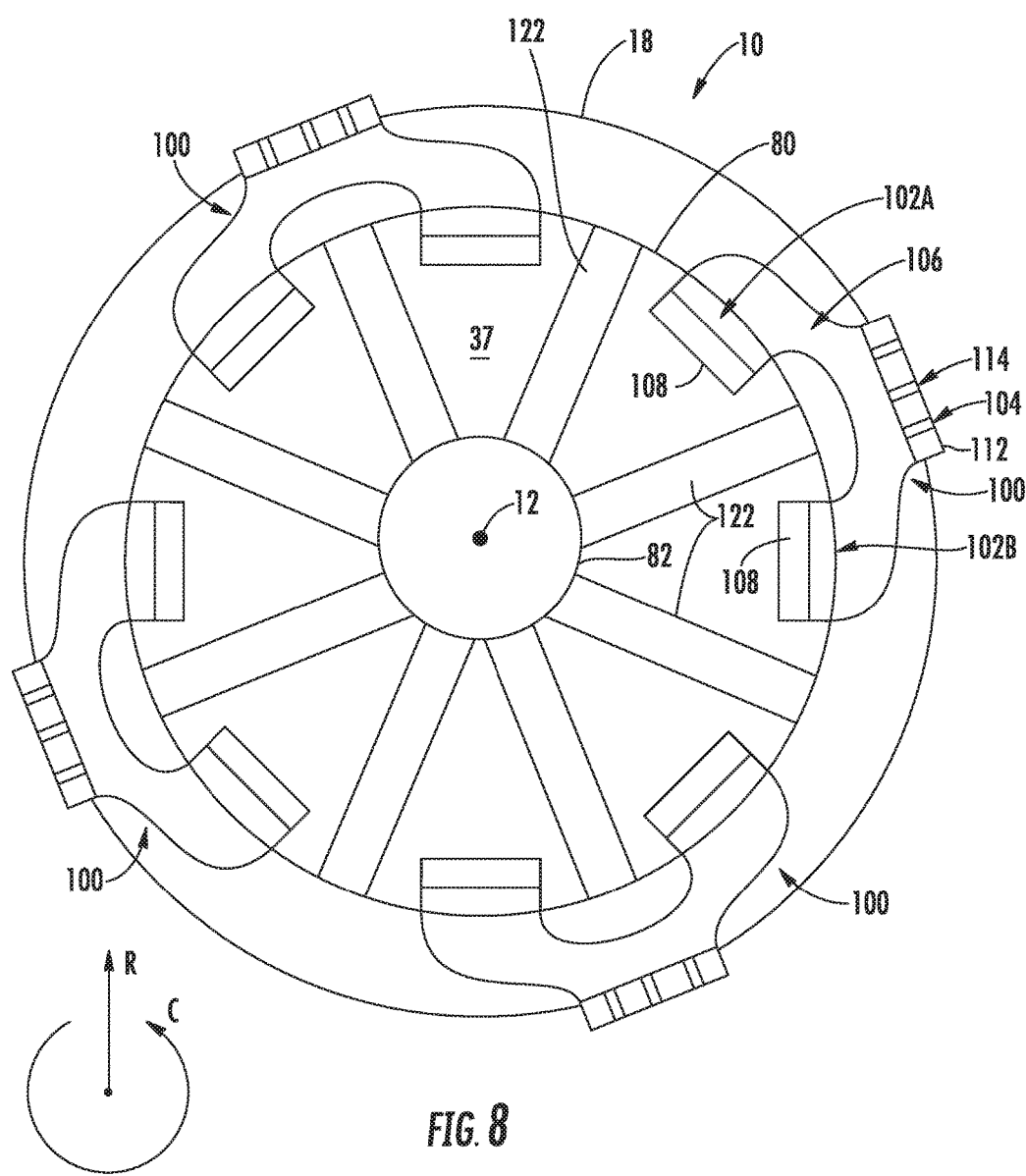
FIG. 8 is an axial view of the exemplary bleed air assembly of FIG. 6.

Notably, referring now briefly to FIG. 8, a schematic, axial view is provided of the exemplary bleed air assembly 100 of FIGS. 6 and 7. As is depicted, for the embodiment depicted, the exemplary bleed valve 102 depicted in FIGS. 6 and 7 is a first bleed valve 102A, and the bleed air assembly 100 further includes a second bleed valve 102B. The duct 106 of the bleed air assembly 100 is in airflow communication with both the first bleed valve 102A and the second bleed valve 102B, and is further configured to provide such flow of bleed air to the outlet 104.

It should be appreciated, however, that although for the embodiment depicted the bleed air assembly 100 includes a duct 106 in airflow communication with two separate valves, in other embodiments, the bleed air assembly 100 may instead include a duct 106 in airflow communication with a single bleed valve 102. Alternatively, the bleed air assembly 100 may instead include a duct 106 in airflow communication with three or more bleed valves 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction, the gas turbine engine comprising:
   a first compressor;
   a second compressor located downstream of the first compressor;
   a casing surrounding the first compressor;
   a liner extending aft from the first compressor to the second compressor, the liner at least partially defining a core air flowpath from the first compressor to the second compressor;
   a core turbine frame assembly extending between the liner and the casing, the core turbine frame assembly comprising a forward frame member and an aft frame member, the forward frame member and the aft frame member each being positioned aft of the first compressor and forward of the second compressor and extending from the liner to the casing; and
   a bleed air assembly comprising;
      a bleed valve positioned in the liner, the bleed valve comprising a door assembly configured to move between an open position and a closed position, wherein the door assembly comprises a transition passage which pivots with the door assembly as the door assembly moves between the open position and the closed position; and
      a duct in airflow communication with the bleed valve, the duct including a liner structure positioned within the core turbine frame assembly and between the forward frame member and the aft frame member, the liner structure defining an outlet of the duct, and the duct extending to the casing,
   wherein the aft frame member intersects the casing at a first position, the forward frame member intersects the casing at a second position, and wherein the outlet is positioned at the casing at a location forward of the first position and aft of the second position, the outlet being configured to exhaust a bleed air flow through the casing at the location of the outlet.

2. The gas turbine engine of claim 1, wherein the transition passage is aligned with the duct when the door assembly is in the open position.

3. The gas turbine engine of claim 2, wherein the transition passage is misaligned with the duct when the door assembly is in the closed position.

4. The gas turbine engine of claim 2, wherein the transition passage is in airflow communication with the core air flowpath and the duct when the door assembly is in the open position.

5. The gas turbine engine of claim 1, wherein the bleed valve is a first bleed valve, wherein the bleed air assembly further comprises a second bleed valve, and wherein the duct is in airflow communication with the first bleed valve and the second bleed valve.

6. The gas turbine engine of claim 1, wherein the liner is an outer flowpath liner, the gas turbine engine further comprises an inner flowpath liner, and the inner flowpath liner and the outer flowpath liner together define a portion of the core air flowpath extending between the first compressor and the second compressor.

7. The gas turbine engine of claim 1, wherein the first compressor, the casing, the liner, and the bleed air assembly are configured as part of an engine core of the gas turbine engine, and wherein the gas turbine engine further comprises:
   an outer nacelle at least partially surrounding the engine core and defining a bypass passage with the casing, wherein the outlet of the duct is in airflow communication with the bypass passage through the casing.

8. The gas turbine engine of claim 1, wherein the casing defines an opening, wherein the outlet of the duct is positioned at the opening of the casing.

9. The gas turbine engine of claim 7, wherein the bleed air assembly comprises a plate positioned in, or over, the outlet of the duct, and wherein the plate defines a plurality of airflow holes.

* * * * *